United States Patent [19]
Grossi

[11] Patent Number: 4,885,986
[45] Date of Patent: Dec. 12, 1989

[54] AUTOMATIC COMPACT MACHINE FOR THE PRODUCTION OF COFFEE AND INFUSIONS, ESPECIALLY FOR DOMESTIC USE

[76] Inventor: Lucio Grossi, Via Sylva 30, Milano, Italy

[21] Appl. No.: 213,705

[22] Filed: Jun. 30, 1988

[30] Foreign Application Priority Data

Jul. 9, 1987 [IT] Italy ................................ 21238 A/87

[51] Int. Cl.$^4$ ............................................. A47J 31/24
[52] U.S. Cl. ................................. 99/289 R; 99/302 P
[58] Field of Search ...................... 99/289 R, 279, 280, 99/281, 282, 283, 297, 300, 302 R, 302 P; 426/433

[56] References Cited

U.S. PATENT DOCUMENTS

| | | | |
|---|---|---|---|
| 3,660,117 | 5/1972 | Neely | 99/289 R |
| 4,457,216 | 7/1984 | Dremmel | 99/289 R |
| 4,667,586 | 5/1987 | Harada | 99/289 R |

*Primary Examiner*—Robert W. Jenkins
*Attorney, Agent, or Firm*—Herbert Dubno

[57] ABSTRACT

The automatic machine for the production of coffee and infusions according to this invention comprises a filter-carrying element having on the base a movable filter for the filtration of the infusion of coffee, into which element there can be sealingly inserted a piston equipped with means for the delivery of hot water under pressure supplied from a metering unit, in which the piston is carried by a transverse bar extending between two parallel side members of the machine and equipped with a pair of connecting rods adjacent to the lateral members and associated with elastic means for exerting tension on the piston and connected eccentrically to respective discs which can be rotatably actuated by a geared motor, there being present means for friction blocking of the piston in a lowered position in the filter-carrying element, these means determining the irreversible transmission of the movement from the motor to the piston, means being also present for the automatic expulsion of the exhausted infusion substance and for cleaning of the surfaces in contact with it.

13 Claims, 6 Drawing Sheets

AUTOMATIC COMPACT MACHINE FOR THE PRODUCTION OF COFFEE AND INFUSIONS, ESPECIALLY FOR DOMESTIC USE

FIELD OF THE INVENTION

The present invention relates to an automatic machine for the production of coffee, especially for domestic use.

BACKGROUND OF THE INVENTION

For the preparation of coffee, in particular of espresso coffee, that is to say of an infusion obtained from hot water and coffee powder, apparatuses of various classes are used, which in every case provide for causing water at high temperature, raised to a sufficient pressure, to pass through a layer of coffee powder, then collecting the infusion thus obtained.

To produce a coffee of high quality, it is desirable that the infusion water shall be at a temperature lower than boiling temperature, in order to avoid removing from the coffee powder, in addition to the aromatic components which give flavor to the beverage, also undesirable components and even at times harmful components, which only leave the coffee powder at temperatures greater than the boiling point of water.

Considerable use is therefore made, both in public buildings and in private dwellings, of apparatuses which, by feeding water through the powder without bringing it to boiling point, enable drinks of high quality to be obtained.

In particular, for domestic use, a machine is required for the preparation of coffee which shall be compact and of limited cost.

The automatic machines for producing coffee provide for locating the coffee powder inside a filter-carrying element, equipped with a filter for retaining the coffee powder and allowing the infusion produced to pass through, for pressing the powder with a piston to a suitable degree and for feeding, by means of said piston, pressurized hot water for producing the infusion.

For this purpose, there should be provided a motor device which shall cause insertion of the piston into the filter-carrying element and maintain its position during the feeding of pressurized hot water.

For this purpose, use may be made of actuating units with geared motors of an irreversible type, but such geared motors are costly and are not well suited for a machine for domestic use.

During the automatic operation of machines of the type described, the problem furthermore arises of proper cleaning of the filter and of the filter-carrying element to remove exhausted powder, so that new powder may be introduced into it.

In the case of preparation of coffee, such exhausted powder is usually present in the form of a pressed, compact cake, which can be easily thrust laterally without leaving traces; in some cases, however, for example in particular conditions of humidity or the like, the cake of exhausted powder can crumble, leaving a part of the powder on the filter-carrying element; furthermore, when the machine is used for the production of infusions other than of coffee, such as tea or the like, residues such as tea leaves, which are humid and adhere to surfaces may be left.

In these conditions, therefore, it may happen that residues persist in the machine, which, if not completely removed, would alter the taste of the next beverage.

OBJECT OF THE INVENTION

The necessity therefore arises of achieving a complete and accurate removal of the exhausted residues by means of a direct mechanical action upon the surfaces on which these residues remain.

SUMMARY OF THE INVENTION

Said results are achieved by the present invention, which provides an automatic machine for the production of coffee and infusions, which machine comprises a filter-carrying element having, on its base, a movable filter for the filtration of the coffee infusion, into which element there can be sealingly inserted a piston, equipped with means for the delivery of hot water under pressure, supplied from a metering unit. The piston is carried by a transverse bar extending between two parallel side members of the machine and equipped with a pair of connecting rods adjacent to the side members, associated with elastic means for pulling the piston, and connected eccentrically to respective discs which can be actuated rotatably by a geared motor. Means is provided for friction blocking of the piston in a lowered position in the filter-carrying element, these means causing the irreversible transmission of the movement from the motor to the piston, means being furthermore present for automatic expulsion of the exhausted infusion substance and for cleaning of the surfaces in contact with it.

The means for friction blocking of the piston in a lowered position inside the filter-carrying element, which determine the irreversible transmission of the movement from the motor to the piston, are constituted of sleeves slidable axially on the support bar for the piston, and located on either side of the point of attachment of the piston to the bar, there being present wedge means integral with the piston and acting on the sleeves for the conversion of a lifting thrust acting upon the piston into axial thrusts, transverse to the piston, of the sleeves against the lateral members of the machine.

The bar is advantageously equipped with axially blocked end rings, situated outside the side members of the machine and sliding a short distance from them, against which rings the side members themselves bear, in opposite directions, with limited elastic bending under the thrusts of the sleeves caused by the wedge means, the lateral members remaining clamped between the sleeves themselves and the end rings of the bar.

In particular, the wedge means for converting the axial thrust acting on the piston into axial thrusts, transverse to the piston, of the sleeves against the lateral members of the machine, comprise at least one plate, integral with the piston, and having oblique, upwardly converging edges, against which thrust elements connected to the sleeves slidable on the support bar bear, having a relative spacing less than the maximum distance between the oblique sides of the plate.

The piston is equipped with a coaxial pin, slidably engaged in the transverse support bar for the piston itself, and carries a pair of vertical, parallel plates having opposite, upwardly converging inclined edges, with which two pairs of rollers having horizontal axes engage, these rollers being mounted respectively on the one and the other of the sleeves axially slidable on the support bar, the sleeves being thrust laterally in opposite directions against the side members of the machine, when a lifting thrust acts on the piston.

The connecting rods for imparting movements to the piston are secured, at one end, to a pin of a disc, the disc being rotatably driven by a geared motor, and at the opposite end they possess respective slots with their axes aligned towards the pin, into which slots are inserted the ends of the bar carrying the piston, the lower edge of the slots acting on the bar during the lifting phase of the piston, the bar being also connected to the pins of the discs by means of springs or similar elastic devices causing the descending motion of the piston with a force substantially independent of the variations in thickness and resistance of the powder to be compressed, sliding of the bar in the slots of the connecting rods being permitted in this phase.

The bar carrying the piston slides in the slots of respective plates supported in oscillating manner on the sides of the machine, the top ends of said slots being at a lower level than the maximum rise of the piston, a rotation of the plates about their respective support pins taking place during this rise, at the instant of contact between bar and top end of slot, means being also present for rotational connection between the bar carrying the piston and the plates, these means being adapted for determining a lateral inclination of the piston at the top of its upward stroke.

To the oscillating plates there is attached a removal blade for the exhausted coffee powder, oscillating on associated bearing pins and equipped with elastic means biasing its lower edge onto the surface of the filter-carrying element in every position of oscillation of the plates.

The movable filter situated inside the filter-carrying element can be raised, by means of mechanical transmission elements associated with the bar carrying the piston, as far as the upper edge of the filter-carrying element, thus carrying on top of it the exhausted coffee powder into a position in which the powder itself is removed by the blade, sweeping in contact along the surface of the movable filter.

The discs which can be rotatably driven by the geared motor are equipped with respective series of cams associated with electrical switches which determine, during the course of one complete revolution of the discs, the successive operating phases of the machine.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
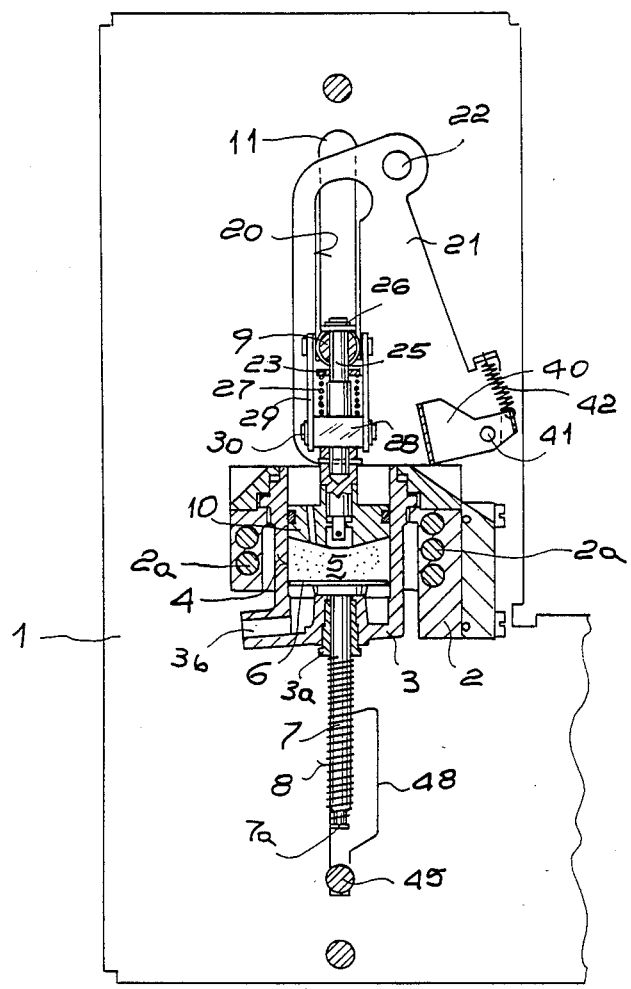
FIG. 1 is a longitudinal section of the machine according to this invention taken along the line I—I of FIG 2.

The machine according to this invention is composed substantially of a pair of lateral members 1, to which is attached the support 2, inside which is situated the filter-carrying element 3, equipped internally with a chamber 4 adapted for receiving the coffee powder 5 and bounded at the bottom by the blind filter 6, equipped with a pin 7 slidable in the filter-carrying element 3 and kept in the lower position by a spring 8 placed between its end shoulder 7a and the slide ferrule 3a of the filter-carrying body 3. Below the blind filter 6, the filter-carrying body 3 possesses the discharge duct for the infusion 3b. Between the lateral members 1, there is a transverse bar 9, to which is secured in the median position a piston 10, capable of being sealingly engaged into the chamber 4 of the filter-carrying element 3.

The bar 9 passes through the lateral members 1 in the associated slots 11 and is engaged, at both its ends, in the elongated holes 12 of respective connecting rods 13, articulated at the lower end to pins 14 of the cam discs 15, keyed onto the take-off shaft 15a of a geared motor unit 16. The bar 9 is connected to the pins 14 by springs 17 and respective small plates 18, 19.

The bar 9, in addition, is slidably engaged in the shaped slot 20 of a pair of plates 21, adjacent to the lateral members 1 and rotatable about respective pins 22, mounted laterally offset from the longitudinal axis of the slots 20. In the slots 20 there are also engaged the ends of a bent lug 23, secured to the bar 9 by associated screws 24, which determine rotational coupling between the bar 9, and the piston 10 secured to it, and the plate 21.

As FIG. 1 shows, the piston 10 is linked to the bar 9 by means of a pin 25, passing perpendicularly through the bar itself and equipped with a top retaining ring 26. The pin 25 can slide axially in the bar 9 through a short distance and is kept in the lowered position by the action of a spring 27, bearing at one end against the lug 23, integral with the bar 9, and at the other end against a block 28 integral with the pin 25.

Figure 2:
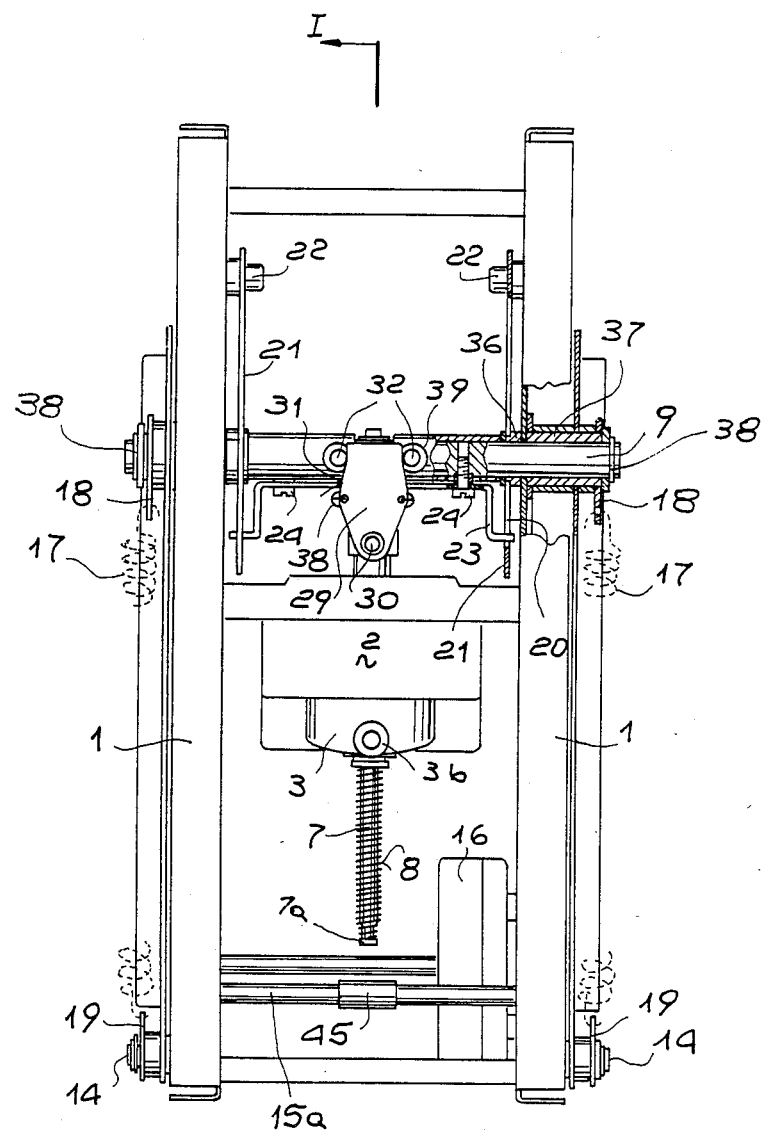
FIG. 2 is a front view of the machine of FIG. 1.
Figure 3:
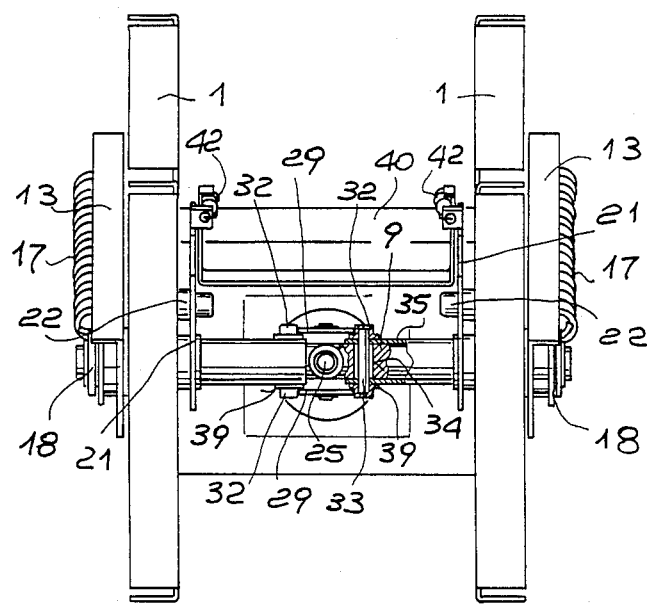
FIG. 3 is a top plan view of the machine of FIG. 1.

On the two opposite faces of the block 28 parallel to the axis of the bar 9, two shaped plates 29 are also secured by means of a pin 30. These plates, as illustrated in FIG. 2, have oblique, upwardly converging opposite edges 31, with a slope of a few degrees relative to the vertical; against these oblique edges there bear two pairs of rollers 32, rotatably mounted on pins 33, having horizontal axes, passing transversely through associated elongated holes 34 of the bar 9 and engaged also in corresponding holes of the sleeves 35, slidable on the bar 9, as can be seen in FIG. 3.

The relative distance between the rollers 32 is less than the maximum width of the plates 29. An upward thrust applied to the piston 10, such as that due to the pressurized water supplied to it for the preparation of the infusion, therefore, causes an upward thrust of the plates 29, which is converted into the form of horizontal thrusts, as a consequence of the action of the oblique edges of the plates, on the rollers 32 and from them to the sleeves 35, thrusting them against the lateral members 1 and thereby blocking the bar 9 by friction in the position reached.

The thrust of the sleeves 35, parallel to the axis of the bar 9, is transmitted to the lateral members 1 by the rings 36 and is transmitted onto the bar 9 via the spacer sleeve 37 and the elastic end blocking rings 38. In this manner, the lateral members 1 are clamped on both surfaces during blocking of the bar 9 and are not called upon to resist unbalanced outward thrusts.

With advantage, to the benefit of simplified and economic construction, the rollers 32 are fitted onto the relative pins 33 without any axial retaining devices and are kept in position by the action of the plates 29, secured by clips 38, on the flanges 39 of the rollers themselves.

The plates 21 also carry a scraper blade 40, rotatably mounted on pins 41 and extending across the entire space between the plates 21; a spring 42, secured between the scraper plate 40 and one of the plates 21, keeps the lower edge of the scraper plate in sliding or sweeping contact on the upper surface of the filter-carrying element 3 in every phase of rotation of the plates 21.

Figure 6:
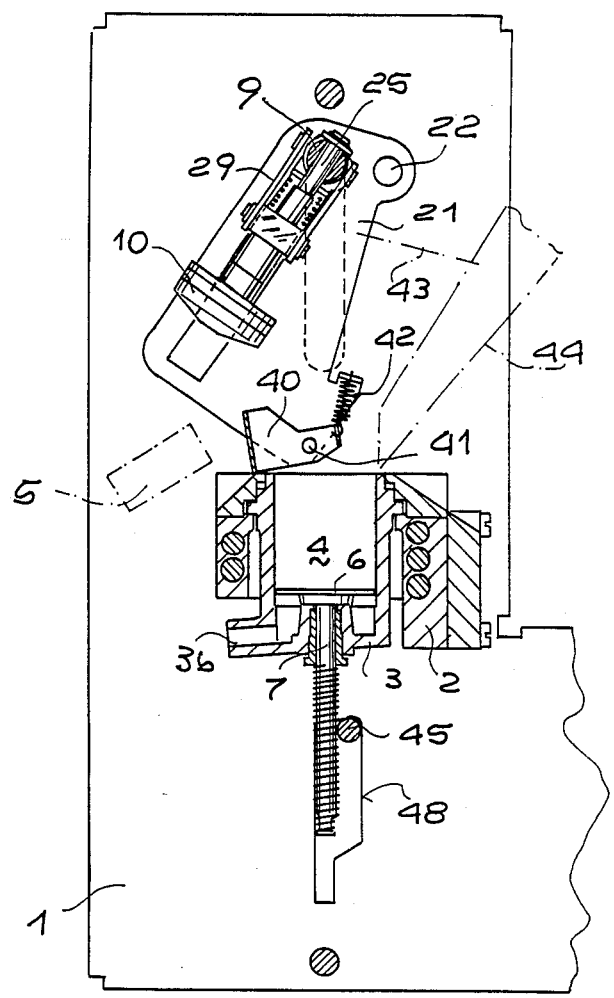
FIG. 6 is a sectional view of the machine of FIG. 1 in the phase of expulsion of the exhausted coffee cake and of charging with new coffee powder.

To the plates 21, there is also connected, by connecting rods or the like not shown, a chute 43, oscillatingly mounted on the structure and shown schematically in FIG. 6.

Figure 4:
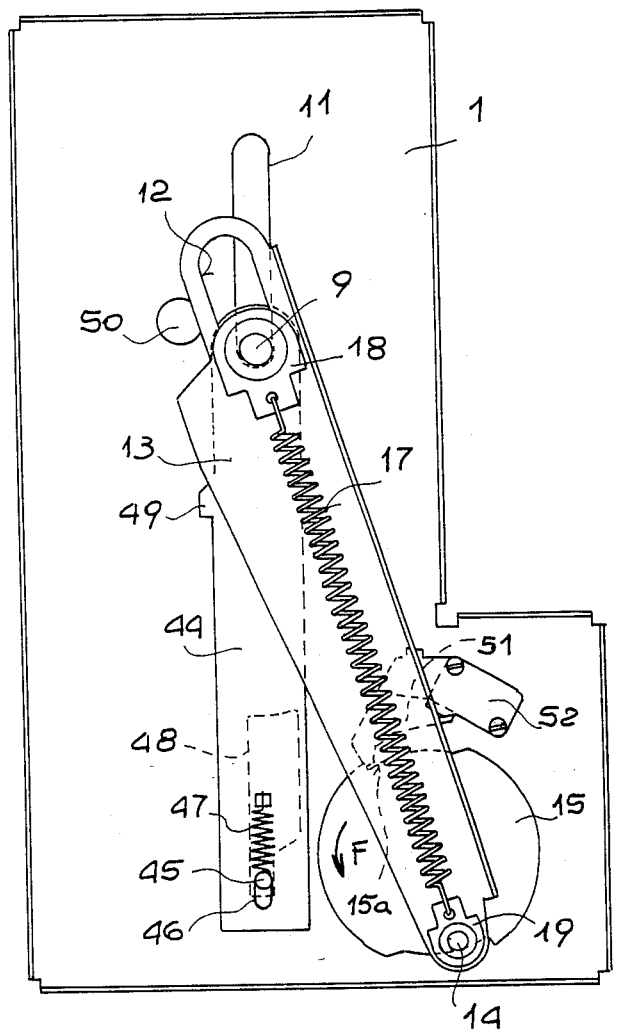
FIG. 4 is a side view of the machine of FIG. 1.

Against the lateral members 1, as can be seen from FIG. 4, there are also mounted on the bar 9 two sliders 44, carrying at the lower end a transverse bar 45, inserted into a slotted hole 46 and secured to the slider 44 by a spring 47.

Figure 5:
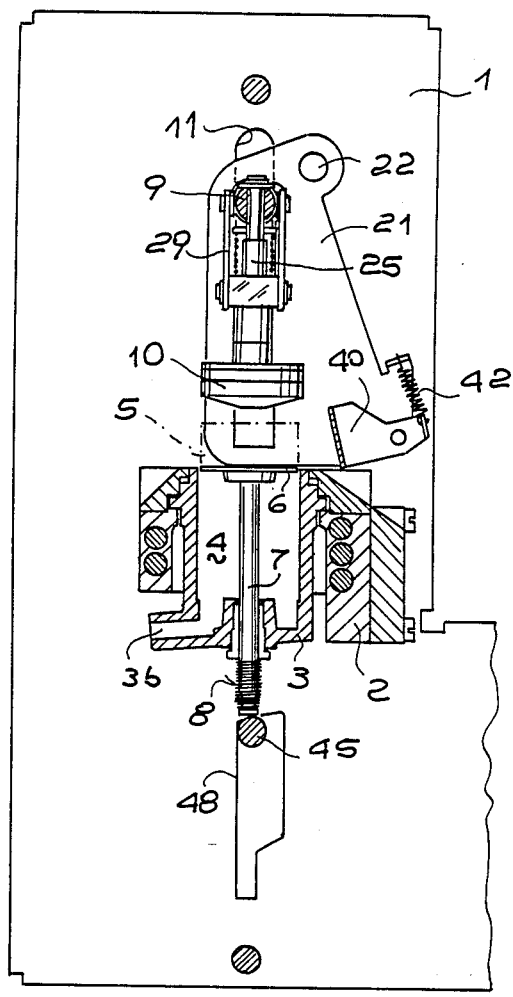
FIG. 5 is a sectional view of the machine of FIG. 1 in the opening phase.

The bar 45 passes through the lateral members 1 by means of the shaped holes 48, the profile of which is shown in solid lines in FIGS. 1, 5 and 6 and in dot-and-dash line in FIG. 4.

The sliders 44 are also equipped with a lateral projection 49 and, in correspondence with these, there are also present on the lateral members 1 fixed stops 50, located on the upward moving path of the sliders.

The support 2 houses inside itself, the electrical resistor 2a, surrounding at least partly the filter-carrying element 3 and adapted for heating the water and keeping it hot; the hydraulic circuit for heating and supplying water to the piston 10 can be of known type, for example as described in Italian Patent Application No. 22197 A/86 (corresponding to copending U.S. application Ser. No. 112,941, now U.S. Pat. No. 4,797,521, issued Jan. 10, 1984), and is therefore not described here in detail.

The geared motor unit 16 carries cam discs 15, with one of which there is associated a lever 51 acting on a switch 52. At the opposite side of the machine, the shaft of the geared motor carries a similar cam disc, not shown, to which there is attached the corresponding connecting rod 13, and the profile of which enables the hydraulic circuit of the machine to be operated by means of an associated switch. These switches in combination enable the successive operating phases for preparation of a coffee to be determined during the course of one complete revolution of the geared motor itself.

The operating cycle of the machine envisages, initially, the machine disposed in the position shown in FIG. 6, with the piston 10 retracted from the chamber 4 and rotated to one side, leaving the mouth of the chamber 4 itself free for receiving fresh coffee powder, with the pin 14 of the cam disc 15 located in a position near its top dead center and diametrally opposite that of FIG. 4.

At start-up of the machine, a metering device and grinder, associated with the machine itself and not shown here, which may be of known type, provides for powdered coffee to be fed into the chamber 4 via the chute 44.

The subsequent rotation of the geared motor brings the cam disc 51 to rotate in the direction of arrow F in FIG. 4, in such a manner that the pin 14 descends, causing by means of the springs 17 the descent of the bar 9 which, by sliding in the shaped slot 20 of the plates 21, causes these plates to rotate, thus bringing the piston 10 into a vertical position and retracting the scraper blade 40.

Continuing its downward movement under the pull of the springs 17, the piston 10 engages into the chamber 4 and carries out compression of the fresh coffee powder in the chamber, with a pressure determined by the stiffness of the spring 27 used, which determines a vertical load on the plates 29 which is transmitted by them to the sleeves 35 and causes blocking of the movement of the bar 9, in a manner substantially independent of the total travel executed by the pins 14, determining the pull by means of the springs 17 on the bar, and likewise independently of the quantity of powder metered into the chamber 4.

The difference in travel between the piston 10 and the pins 14 is absorbed by corresponding variations in elongation of the springs 17 which occur with the compression of different quantities of powder.

The independent movement between the bar 9 and the connecting rod 13 is assured by sliding of the bar in the slot 12.

At the end of the rotation of the cam disc 15, which leads to complete compression of the coffee powder 5 in the filter-carrier 3, the disc 15 is stopped in the position shown in FIG. 4 by the switch 52, the lever 51 of which engages into an associated recess 15a.

This stopping position immediately precedes, in the rotational direction of the disc 15, the dead-center position in which the direction of pull of the springs 17 is aligned with the line connecting the axis of the pin 14 with the rotational axis of the disc 15 itself. Under these conditions, the springs 17 would tend to cause a rotation in the opposite direction of the discs 15 and of the geared motor 16, and said rotation is prevented by the lever 51 of the switch 52, engaged as already stated in the recess 15a of the disc 15.

In the stopping position of the disc 15, the hydraulic circuit of the machine is available for the production of the coffee by supplying hot water under pressure to the piston 10.

In such conditions, the position of the piston under the action of the feed pressure of the water is maintained, without the geared motor 16 being engaged for this purpose, because the thrust resulting from the pressure is transmitted via the plates 29 to the sleeves 35, as described, locking, by friction, the bar and the piston connected with it to the lateral members 1 of the machine.

The pressure inside the chamber 4 produces, in every case, a slight yielding of the piston 10, resulting from taking-up of play and elastic deformation under load of the bar 9. This retraction of the piston 10 results in the forming of a space between the surface of the filter 5 and the coffee powder, the space advantageously not exceeding one millimeter. This space is beneficial, because it makes possible a complete and uniform distribution of the pressurized water over the coffee, obtaining for it the optimum benefit of its entire area.

This favorably permits, therefore, an effective use of "blind filters" having a single passage opening, in which is slidably engaged a movable element, as described in detail in the earlier Italian Patent Application No. 24844

A/81 of the same applicant, both for the lower filter through which the coffee produced passes and for the upper filter, mounted on the piston, having the function of distributing the water over the area of the coffee powder, thus achieving constant maintenance of a clear passage, free of lime deposits or coffee residues, and ensuring at a same time that the flow of water entirely encompasses the powder without leaving any dead zones that are not perfectly wetted.

Instead of the filters according to the above mentioned Italian Patent Application No. 24844 A/81, other types of conventional filters with holes may also be used.

The coffee therefore passes through the filter 6 and accumulates inside the filter-carrier 3, from which it issues via the spout 3b. The cam disc 15 then completes its rotation under the action of the geared motor 16, causing raising of the bar 9 and piston 10 carried by it: this lifting can be carried out with a small force, because this force acts directly on the bar 9 via the connecting rods 13, while the spring 27 causes the plates 29 to move away from the rollers 32.

The piston 10 is now extracted from the chamber 4 and is raised vertically until correspondence with the position of contact of the bar 9 with the upper end of the slot 20.

During the rise of the bar 9, this bar entrains with it the slider 44 thus causing, by means of the bar 45 in contact with the rod 7, lifting of the blind filter 6 and expulsion from the chamber 4 of the exhausted coffee powder cake 5, into the position shown in FIG. 5, bringing the exhausted coffee powder cake 5 resting on the filter 6 out of the chamber 4.

In these conditions, the blind filter 6 is kept raised, as a result of the action of the bar 45 on its rod 7.

The piston 10 now rises further, as far as the position in which the bar 9 strikes against the upper end of the slot 20, causing rotation of the plates 21 about the pins 22 and, as a result of the bent lugs 23, rotation takes place of the piston 10, uncovering the mouth of the chamber 4 and, at the same time, removing the cake of exhausted coffee 5 by means of the scraper blade 40, as shown in dot-and-dash line in FIG. 6.

The scraper blade 40, during its travel over the filter-carrier 3, remains in contact with the latter as a consequence of the action of the springs 42: this makes possible complete removal, from the blind filter 6 and from the surrounding surfaces, of the exhausted powder.

This is especially advantageous in the case where the machine is used, not only for the preparation of coffee or as an alternative to this, but also for the production of infusions of different substances, such as tea, which is constituted of small leaves which, once they are wetted, become particularly adherent to the surfaces with which they are in contact. The "rasping" action given by the scraper blade 40 then permits complete removal of these substances.

At the end of the upward travel of the bar 9, together with the rotation of the plates 21 and of the scraper blade 40, the lateral projections 49 of the sliders 44 strike against the corresponding fixed stops 50, causing the slider 44 to rotate through a small angle, which causes the bar 45 to disengage from the rod 7, so that the filter 6 can return into the lower position under the action of the spring 8, while the bar 45 can subsequently return to the lower position during the descent of the bar 9, sliding in the slot 48 laterally alongside the rod 7. In these conditions, with the piston 10 in the rotated position and the chamber 4 empty, with the blind filter lowered and ready to receive a new dose of powder, the machine is stopped.

In correspondence with the start of the upward controlled movement of the piston 10, after production of the coffee, the hydraulic circuit of the machine releases the pressure inside the piston itself, thus eliminating the upward thrust on the plates 29 and therefore allowing the spring 27 to disengage them from the rollers 32.

The machine according to this invention, in addition to the advantages in common with those of the machine of the U.S. Pat. No. 4,796,521 already mentioned, for the parts that are common to both, possesses a simpler structure which is economical to produce, lending itself also to the use of infusion substances other than coffee even if those substances, after use, adhere to the surfaces of the filter and of the filter-carrying body, assuring their effective removal.

The components of the machine relating to the control of the cycle, the feed and distribution of the coffee, the hydraulic circuit of the machine and so on, may be of known type and therefore have not been described in detail Numerous variants can be introduced, without thereby departing from the scope of the invention in its general characteristics.

I claim:
1. An automatic machine for the production of coffee, comprising:
   two parallel lateral members, said members being spaced from each other, each of said lateral members being formed with a respective guide element having an axis;
   a filter carrier having a carrier axis parallel to said axis of said guide elements operatively connected with said lateral members and provided with an internal compartment having a base thereof, said compartment being open upwardly at an end thereof opposite said base;
   a filter disposed at said base of said compartment for filtrating a coffee infusion, said filter and said filter carrier being axially movable relative to one another;
   a piston axially movable up and down in said filter carrier and engageable with said compartment, said piston forming a watertight seal with said compartment, said piston being provided with means for delivering a hot water into said compartment;
   a transverse bar guided in said guide elements of said lateral members and having a bar axis perpendicular to said carrier axis, said bar being operatively connected with said piston;
   a geared motor having a shaft extending parallel to said bar;
   a disc operatively connected with said shaft of said motor;
   a first and second connecting rods adjacent to respective lateral members, each of said connecting rods being operatively connected with said transverse bar at one end of said rod and being eccentrically connected with said disc by the other end of the respective rod, so that said rods movable generally parallel to said axes of said guide elements;
   elastic means operatively connected with said bar for pulling said piston toward said base of said compartment;
   means on said transverse bar for friction blocking of said bar in a lower position of said piston, so that the movement of said piston upwardly upon the expansion of coffee in said compartment upon reaching said lower position of said piston is not transmitted to the gear motor;

means for expelling the exhausted infusion substance; and means for automatic cleaning of said movable filter operatively connected with said bar.

2. The automatic machine defined in claim 1 wherein said are sleeves slidably mounted on said transverse bar.

3. The automatic machine defined in claim 2 wherein said means for friction blocking further comprise wedge means operatively connected with said piston and acting upon said sleeves for the conversion of a lifting thrust of said piston into thrusts of said sleeves generally perpendicular to said lifting thrust of said piston.

4. The automatic machine machine defined in claim 3 wherein said wedge means include at least one plate formed with upwardly converging edges and two pairs of rollers slidably mounted on said bar and acting on said sleeves upon contacting said rollers with said upwardly converging edges during the lifting thrust of said piston.

5. The automatic machine defined in claim 1 wherein said transverse bar is formed with axially blocked rings located outside said lateral members on opposite ends of the transverse bar.

6. The automatic machine defined in claim 5 wherein said rings bound said lateral members.

7. The automatic machine defined in claim 1 wherein said cam disk having a pin connected with said connecting rods, each of said connecting rods is formed with a respective elongated slot at an end opposite said one end of the respective connecting rod.

8. The automatic machine defined in claim 7 wherein said cam disc is provided with at least one electrical switch controlling successive phases of the machine.

9. The automatic machine defined in claim 8 wherein said filter is movable.

10. The automatic machine defined in claim 9, further comprising means for displacing said filter.

11. The automatic machine defined in claim 1, further comprising a pair of plates pivotally mounted on respective lateral members by respective plate pins to swing laterally to the direction of movement of said transverse bar and formed with an elongated groove in which said bar slides, a top end of said groove is at a lower level then the maximum rise of said piston and limits the lifting thrust of said bar upon the contact therebetween.

12. The automatic machine defined in claim 11 wherein said plates are operatively connected with means for rotational connections between said bar and said plates and for determining a lateral inclination of the piston at said maximum rise thereof.

13. The automatic machine defined in claim 1 wherein said cleaning means includes a movable blade.

* * * * *